M. H. TYLER.
MEAT TENDERER AND VEGETABLE CHOPPER.
APPLICATION FILED DEC. 11, 1908.
935,710.                                            Patented Oct. 5, 1909.
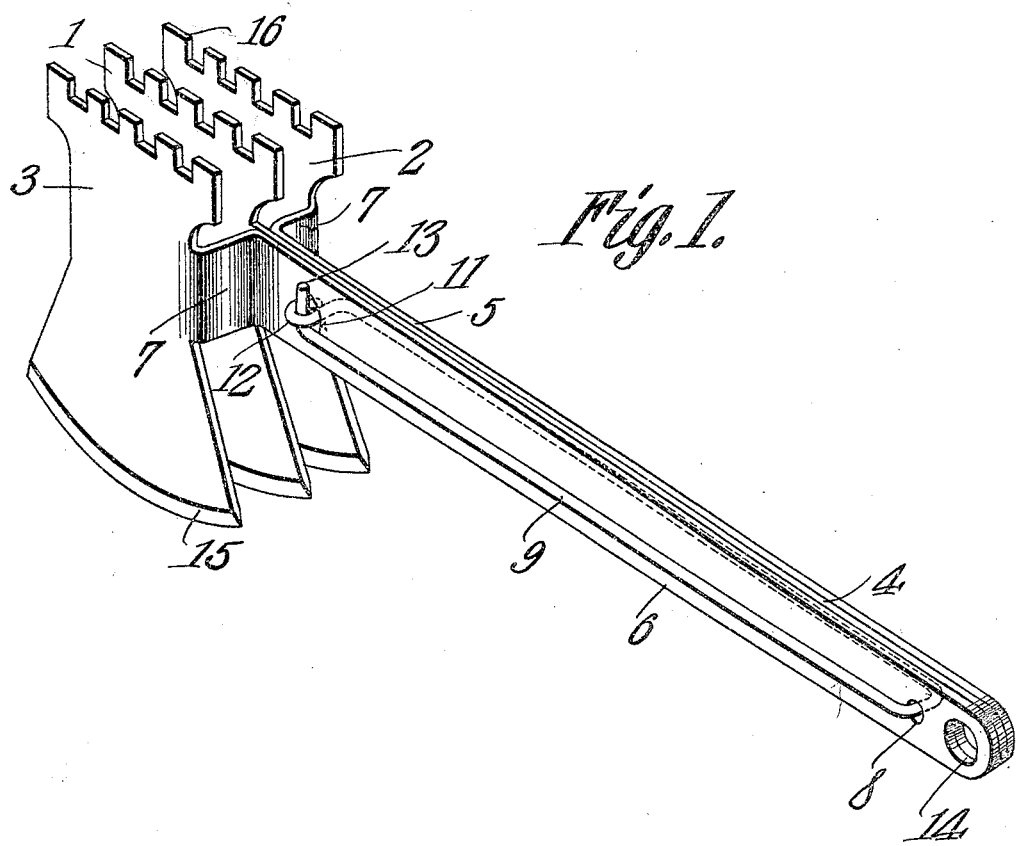
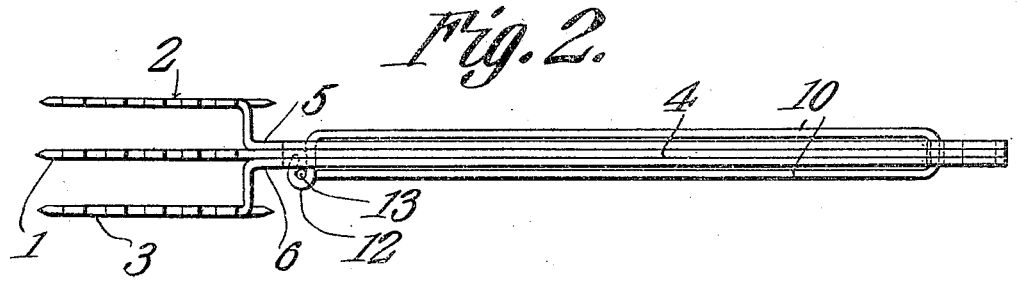
Witnesses
Inventor
Melvin H. Tyler,
By C. A. Snow & Co.
Attorneys

UNITED STATES PATENT OFFICE.

MELVIN H. TYLER, OF MUNCIE, INDIANA.

MEAT-TENDERER AND VEGETABLE-CHOPPER.

935,710.

Specification of Letters Patent.

Patented Oct. 5, 1909.

Application filed December 11, 1908. Serial No. 467,045.

*To all whom it may concern:*

Be it known that I, MELVIN H. TYLER, a citizen of the United States, residing at Muncie, in the county of Delaware and State of Indiana, have invented a new and useful Meat-Tenderer and Vegetable-Chopper, of which the following is a specification.

The objects of the invention are, generally, the provision in a merchantable form, of a device of the above mentioned class, which shall be inexpensive to manufacture, facile in operation, and devoid of complicated parts; specifically, the provision in a novel and improved form, of a meat tenderer and vegetable chopper, the several blades of which may readily be separated for sharpening and cleaning; other and further objects being made manifest hereinafter as the description of the invention progresses.

The invention consists in the novel construction and arrangement of parts hereinafter described, delineated in the accompanying drawings, and particularly pointed out in the appended claims.

Similar numerals of reference are employed to denote corresponding parts throughout the several figures of the drawings.

In the accompanying drawings:—Figure 1 shows my invention in perspective, and Fig. 2 is a top plan thereof.

In carrying out my invention, I provide a central blade 1 upon either side of which are disposed side blades 2 and 3 spaced apart from the central blade 1. The central blade 1 is provided with a handle 4 integral with the blade and disposed in its plane. The side blades 2 and 3 are provided with integral handles 5 and 6 respectively. At the point where these handles 5 and 6 merge into the blades 2 and 3 they are bent sharply at right angles to the blades, as shown at 7, bringing the said handles 5 and 6 into close relation with the handle 4. Near the point where the handles merge into the blade they are provided with alined apertures 11 and at their opposite terminals with other alined apertures 14 forming an eye by which the device may be suspended from a hook or nail. Intermediate the apertures 11 and 14 and relatively close to the apertures 14 are disposed a third set of alined apertures 8. I further provide a clamping member denoted generally by the numeral 9. This clamping member 9 is disposed transversely through the apertures 8 and bent toward the blades to form arms 10 lying close to the handles 5 and 6. The terminal of one of these arms 10 is bent at right angles to the arm proper, passed through the apertures 11 and flexed upon itself to form an eye 12. The other arm is bent sharply upon itself to form an arm 13 arranged to engage the eye 12 of the other arm. The lower edges of the blades are sharpened, as shown at 15, and their upper edges are provided with a series of blunt teeth 16. The sharpened edges 15 may be used to cut vegetables, or to prepare meat for hash, mincemeat or the like, the upper edges 16 being adapted to separate the fibers of meat and to render it tender.

In its preferred form my invention is fashioned from thin sheets of metal cut and bent into the required shape. The construction of my invention results in an inexpensive device of the character specified, which will be light, strong, and sanitary in its maintenance.

Let it be supposed that the device is assembled in the form shown in Fig. 1. When it is desired to separate the several blades for cleaning or sharpening, the arm 13 is withdrawn from the eye 12, the eye 12 in its turn being withdrawn from the apertures 11. The clamping member is fashioned from resilient material and by this construction the terminals of the clamping member 9 may be swung free from the handles, whereupon the blades 1, 2 and 3 may be separated, the handles pivoting at 8. When the blades have been separated in the manner just described, and the operation of sharpening and cleaning them has been perfected, they may be assembled again in the form shown in Fig. 1.

In order to present a concrete embodiment of my invention for illustration, I have shown and described it as comprising a central blade having another single blade disposed upon either side thereof. It is obvious, however, that the number of these side blades may be increased by the addition of other pairs, so that the device instead of comprising three blades, as shown, may have five, seven or more.

Having thus described my invention, what I claim as new and desire to protect by Letters Patent is:—

1. A meat tenderer comprising a series of handles, the several handles being disposed in close relation, and being provided with sets of alined apertures spaced apart; a rod mounted intermediate its ends in one set of apertures to form a pivotal connection between the handles, the rod being bent to form arms arranged to engage laterally the outer handles of the series, the terminal of one of the arms being extended through the other set of alined apertures and being provided with an eye, the terminal of the other arm being bent to engage the eye; and a blade carried by each of the handles.

2. A meat tenderer comprising a series of handles, the several handles being disposed in close relation, and being provided with sets of alined apertures spaced apart; a rod mounted intermediate its ends in one set of apertures to form a pivotal connection between the handles, the rod being bent parallel to the handles to form arms, the terminals of the arms being provided with interlocking elements arranged to engage each other through the other set of apertures; and a blade carried by each of the handles.

In testimony that I claim the foregoing as my own, I have hereto affixed my signature in the presence of two witnesses.

MELVIN H. TYLER.

Witnesses:
 ROBERT ADY,
 GARRETT O. DRISCOLL.